Aug. 21, 1945. P. HOLLSTEIN 2,383,387
APPARATUS FOR TREATING CHOCOLATE AND SIMILAR MATERIALS
Original Filed Nov. 12, 1937 5 Sheets-Sheet 5
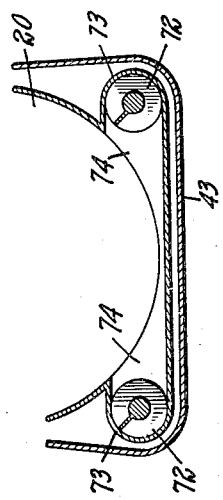
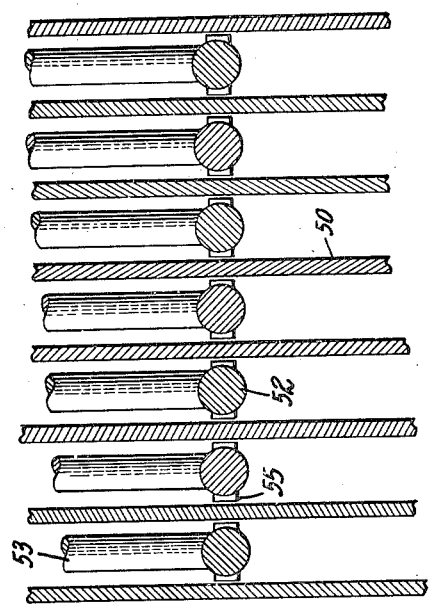
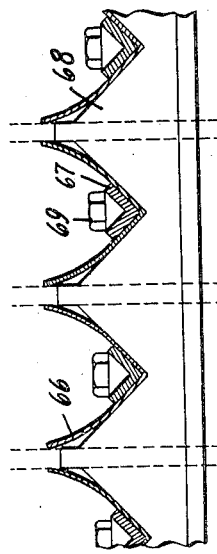
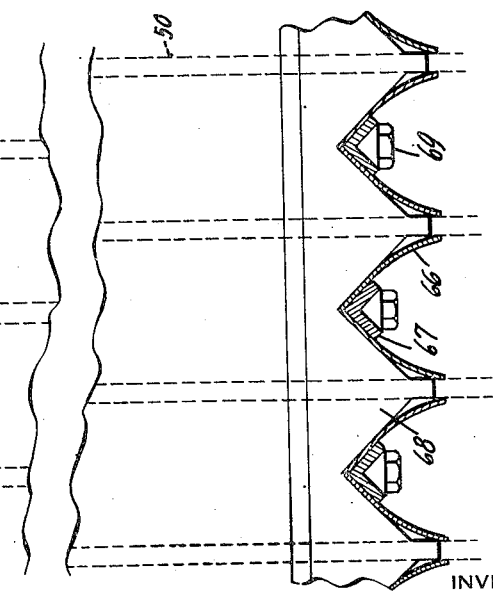
INVENTOR.
Paul Hollstein Dec'd
By Rutherford Trust Company
Administrator
BY
ATTORNEYS.

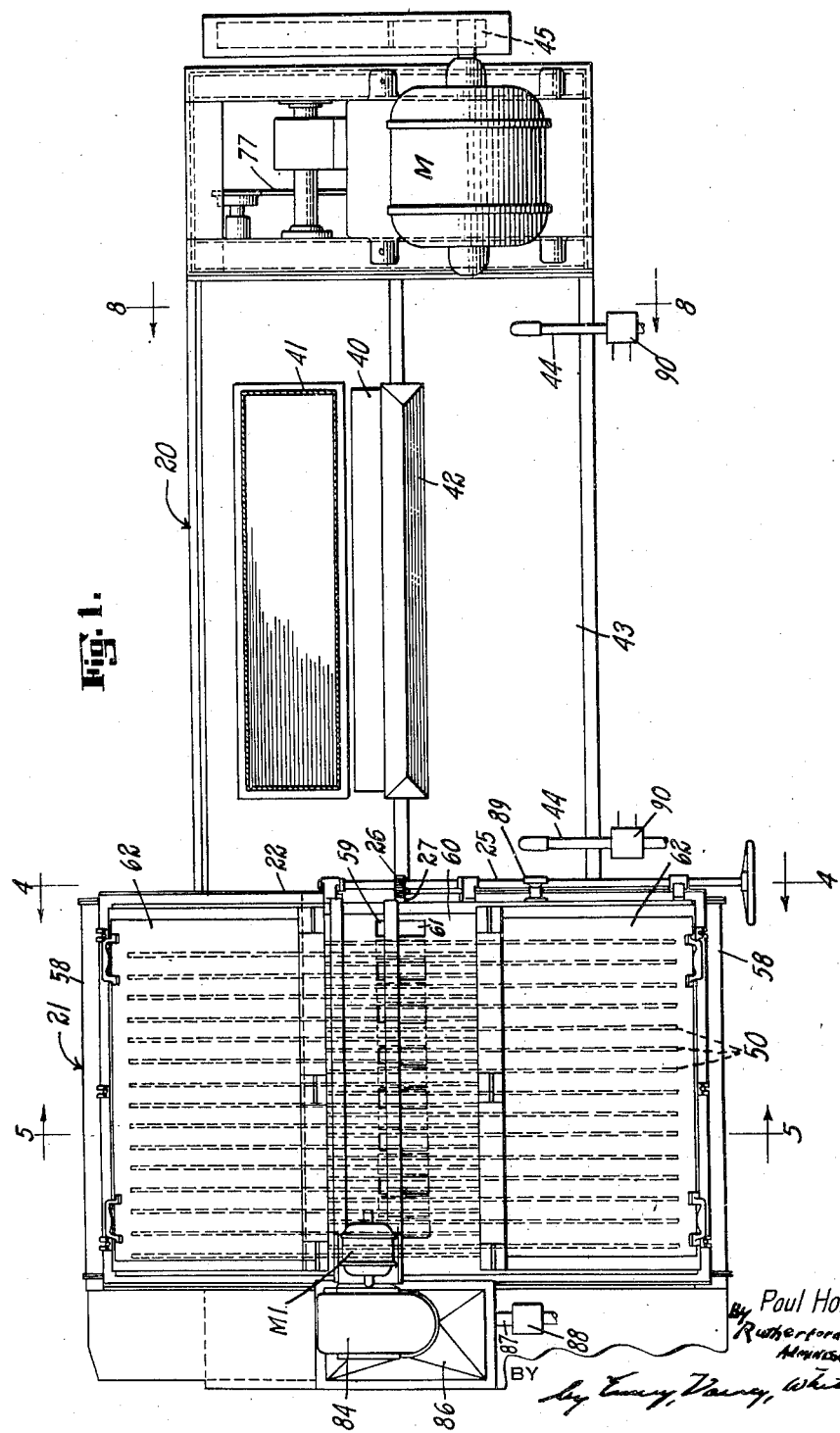

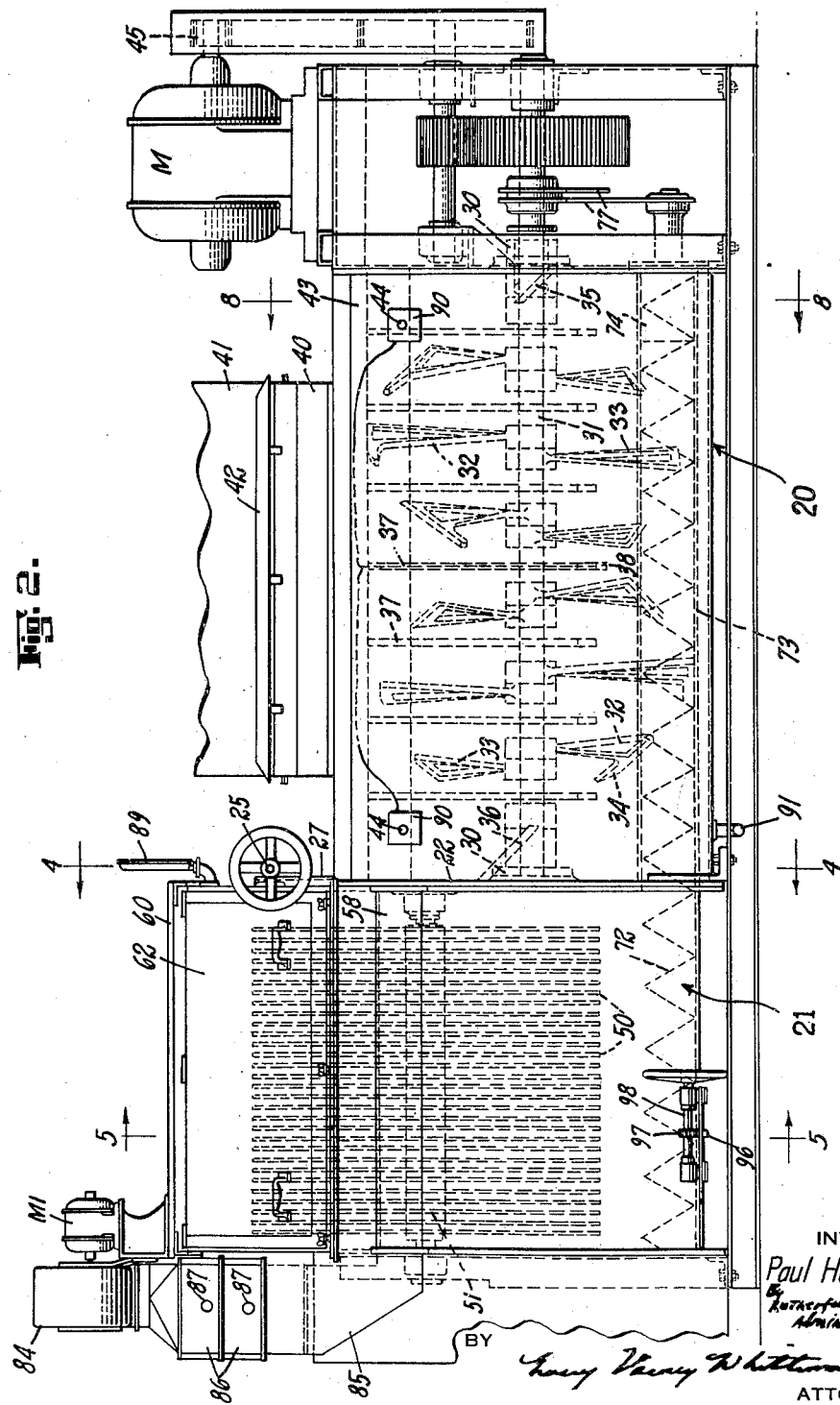

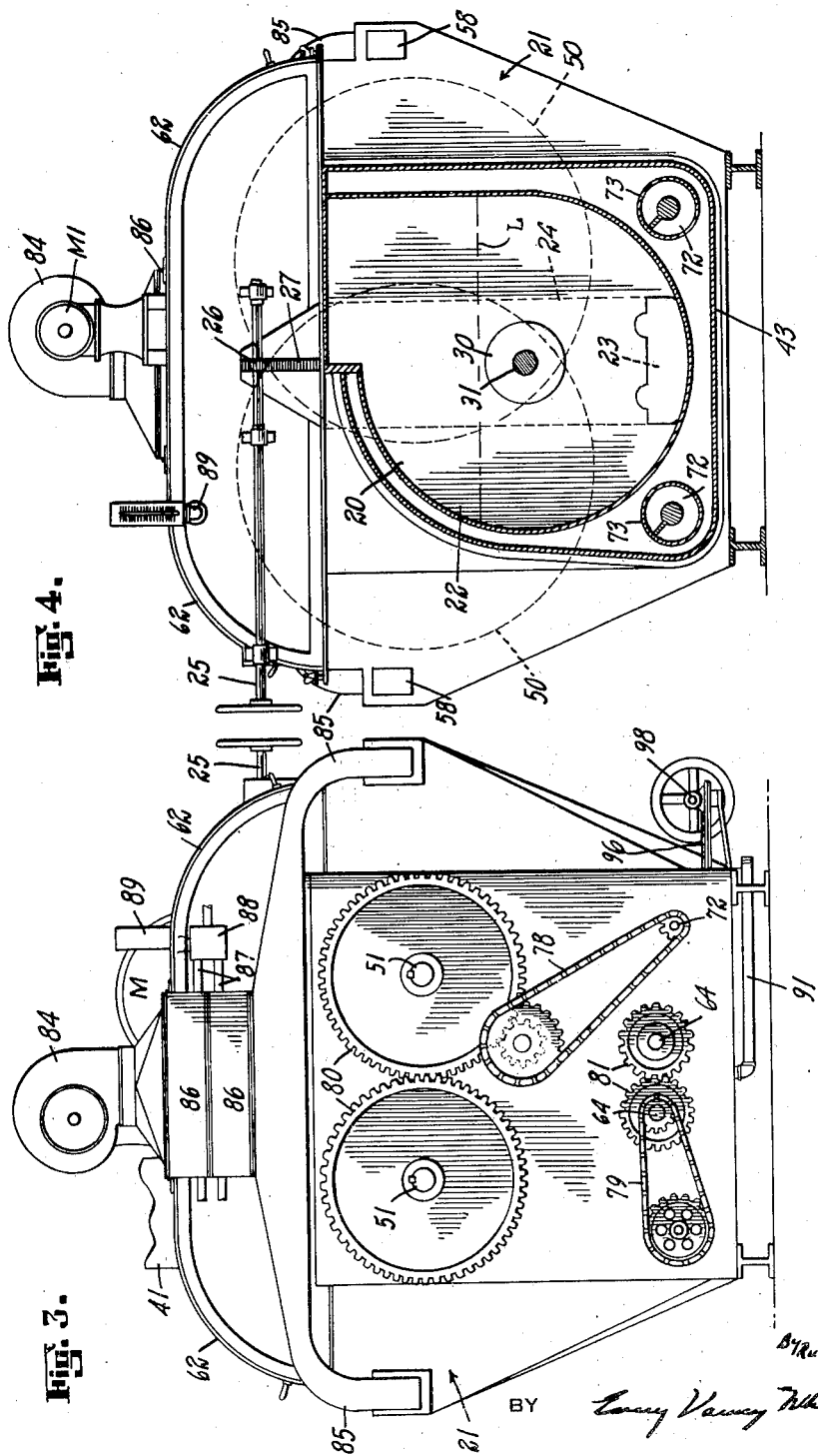

Patented Aug. 21, 1945

2,383,387

UNITED STATES PATENT OFFICE 2,383,387

APPARATUS FOR TREATING CHOCOLATE AND SIMILAR MATERIALS

Paul Hollstein, deceased, late of Carlstadt, N. J., by Rutherford Trust Co., administrator, Rutherford, N. J., assignor to J. M. Lehmann Co., Inc., New York, N. Y., a corporation of New York Original application November 12, 1938, Serial No. 239,991. Divided and this application May 16, 1939, Serial No. 273,932

11 Claims. (Cl. 99—236)

This invention relates to apparatus for treating chocolate, cocoa and other materials requiring aeration, dehydration and agitation for their processing, and has for an object the provision of improvements in this art.

This application is a continuation in part of application Serial No. 136,295, filed April 12, 1937, and a divisional of application Serial No. 239,991, filed November 12, 1938.

For many years chocolate in a semi-plastic, semi-liquid state has been given what is commonly known as a conching treatment for the generally accepted purposes of improving its flavor, reducing its water content, improving its consistency, reducing its tendency to bloom, and accomplishing other useful effects. The term conching, so far as can be learned, first came to be used in connection with the treatment of chocolate in vat-type machines which were curved at each end and in which heavy rollers, usually of stone, were pushed back and forth on the floor of the vat. The rollers produced a wave of material which fell over at each end upon the surface of the body of chocolate with a resounding slap. This wave splash gave an aerating and disintegrating action and, of course, the action of the roller on the bottom of the vat produced a disintegrating or grinding action.

The vat was jacketed and steam-heated and air may have been admitted above the chocolate, or even a draft of heated air may have been passed over the chocolate to remove acrid odors, moisture and perhaps other undesired elements.

Many machines of this type are still being used in places. They require a great amount of floor space and operate very slowly. Chocolate is treated in them for 72 to 120 hours, often more, but seldom less than 72 hours. The reason for the slow action of these conventional conche machines can be readily understood. The roller was quite inefficient in mixing cocoa and sugar with cocoa butter; the aeration was very slow due to the fact that the surface of the mix and the periodical wave splash at each end provided comparatively little surface for air contact; and it was difficult for the undesirable acrid components to be liberated in the process of conching.

The disintegrating action of the roller and of the wave slap might have been necessary at one time but at the present time it is possible to grind the cocoa as fine as desired before it is introduced into the treating machine and no disintegrating action here is necessary. The same is true of sugar.

So while the treatment given the chocolate according to the present invention and by the present apparatus may at times for simplicity be referred to as a conching process, because it accomplishes some of the purposes of the old conching process, it is to be kept in mind that the present process does not correspond in all particulars with the old conching process and is not to be confused therewith.

According to the present invention the aerating action is vastly increased in proportion to a given total amount of material and the mixing action is made much more effective than before, so as to thoroughly beat the material and mix in air when that is present above the material in the mixer. The total result is that the action is extremely rapid and the desired beneficial effects are realized as fully and completely as before but in a far shorter time. The present machine has fully accomplished in 8 to 24 hours all that was accomplished by the old conche machine in 72 to 120 hours or longer. The present machine does not include grinding means as such because such means are no longer necessary; but there may be some incidental disintegration of the material by the rapidly acting mixer blades.

Chocolate and similar materials such as are here considered, are of a pasty consistency. They require agitation to impart to them the desired fluidity. According to the present invention the chocolate is spread out in thin layers when its consistency enables it to be spread easily. The present invention provides means for accomplishing this.

Moreover, chocolate paste, consisting as it does of cocoa butter and finely ground solids of the cocoa mass and sugar must be maintained in agitation in order to be processed as a homogeneous material. This function is provided for by the present invention.

But in addition to accomplishing the effects accomplished by prior art methods and apparatus, the present invention provides other desirable effects which could not be attained. One such effect of great importance is the attainment of full flavor and taste development with the addition of a minimum quantity of cocoa butter. The machine provides for a maximum of dispersion so that the desirable viscosity is maintained with the addition of less butter than is necessary with other machines. The added amount of cocoa butter used in other processes, besides increasing the cost, is injurious to the taste of the chocolate and may cause a bloom which injures its appearance.

Moreover, the dispersion is not connected with the aeration and other progressive changes essential to the processing, this being important since excessive mixing brings about an increase in viscosity undesirable in the finished product.

Likewise it is found to be essential that the aeration and the improvement produced thereby be synchronized with the working of the material since excessive aeration may remove desirable elements essential to the taste of the finished product. The function of the aeration, besides the removal of the undesirable excess moisture, is the removal of undesirable acrid constituents liberated during the processing of the goods.

The objects, advantages and feature of the invention will be manifest from the following description of an illustrative embodiment thereof, the same being shown in the accompanying drawings, wherein:

Fig. 1 is a top plan view;

Fig. 2 is a side elevation;

Fig. 3 is an end view looking at the disc chamber;

Fig. 4 is a transverse vertical section through the mixing chamber taken on the line 4—4 of Fig. 2;

Fig. 7 is an enlarged partial horizontal section taken on the line 7—7 of Fig. 5;

Fig. 8 is a partial vertical section taken on the line 8—8 of Fig. 2; and

Fig. 9 is a longitudinal vertical section taken on the line 9—9 of Fig. 5.

Figures 5, 6:
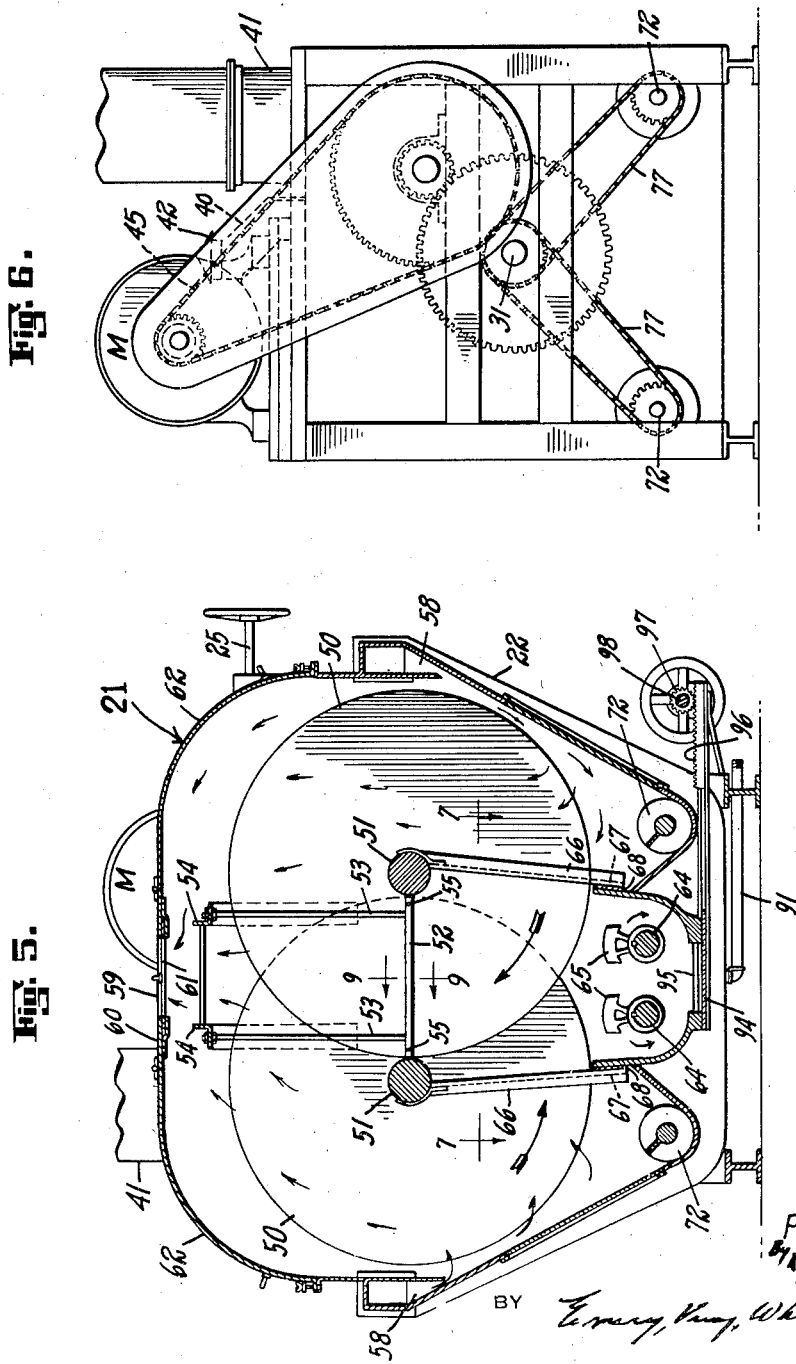
Fig. 5 is a transverse vertical section through the disc chamber taken on the line 5—5 of Fig. 2.
Fig. 6 is an end view looking at the mixing chamber.

The machine illustrated embodies separate means for mixing and aerating the chocolate. As shown in Fig. 2 there is a mixing chamber 20 and an aerating chamber 21. A vertical partition 22 may be provided for separating the mixing chamber from the aerating chamber.

At the bottom center of the partition 22 (Fig. 4) an opening 23 is provided for transferring material from the mixing chamber to the aerating chamber. A vertically slidable gate 24 guided in a slot formed between the two plates forming the partition serves when desired to regulate or prevent the passage of material through the opening 23. The gate may be operated by a hand shaft 25 through a pinion 26 which meshes with a rack 27 on the upper end of the gate.

When the gate is closed material may be agitated in the mixing chamber until it is sufficiently fluid to flow and be spread by the aerating means. When the gate is open the material flows to the aerating chamber. The provision of the gate provides greater flexibility in use of the apparatus by permitting the mixer to act independently of the aerator. By opening the gate the clearing out of material when changing batches or shutting down is facilitated. The machine is so constructed as to be practically self-cleaning merely by continued operation when the discharge outlet is opened.

The partition, while advantageous, is not indispensable and in my earlier filed co-pending application there is shown one construction which does not require it, the aerating chamber there, besides being at a higher elevation, also being disposed directly above the mixing chamber.

The mixing chamber is generally cylindrical in cross-section and the end walls thereof support bearings 30 of a shaft 31 carrying two series of blades 32 and 33. The blades 32, which may be called the feeding blades are longer than the blades 33, which may be called the back-feed blades. The former have inclined curved bars 34 at their ends adapted to scrape or almost scrape the side walls of the mixing chamber. The back-feed blades are shorter and cause strong cross-currents of material but, being smaller than the feed blades, will not feed material as fast as the latter. Consequently all the material is eventually moved in the direction imposed by the feed blades.

The blades of both sets are arranged to follow the preceding blade of the same set quite closely so as to have a sustained effect upon the material. As seen in Fig. 2, this produces a spiral arrangement of the outer ends of the blades, the spiral line of the set of blades 33 being opposite to that of the set of blades 32.

The body of the blades is open to permit material to slip through. This heightens the mixing, beating, or flapping action and slows up the feeding action.

Solid blades 35 and 36 secured to the shaft serve to scrape the end walls of the mixing chamber and the one 36 nearest the aerating chamber is shaped and disposed to feed material to the opening 23 in the partition.

Inclined bars 37 extend down into the mixing chamber on one side to points adjacent the shaft to break up the material as the blades pass on each side of the bars. A thermostat control 38 may be mounted at the lower end of one of the bars to assist in maintaining the desired temperature.

The mixing shaft may be run at any desired speed by any suitable means, as for example by a variable speed drive motor, gears, or the like, but during normal operation, after the material has been reduced to a semi-liquid condition, it is preferably run at a speed of about 75 R. P. M. This produces an intensive mixing action to cause some aeration even in the mixing chamber. This may be described as a beating or flapping action.

Even with the construction shown in the co-pending application, there will always be a certain amount of air in the mixing chamber above the material. In the present construction provision is made for producing a definite circulation of air through the mixing chamber. For example, an air intake duct 40 and an outlet duct 41 may be provided at the top of the mixing chamber to cause an induced draft of air over the material in the chamber or a forced draft may be provided if desired. The inlet duct 40 may be covered by a baffle or cap 42 to exclude everything but air. The outlet duct 41 may be quite long to cause a chimney effect. It may for example, extend to the floor above and serve for feeding material into the machine.

The mixing chamber is provided with a jacket 43 and pipes 44 for steam, hot water, hot air or other suitable medium for heating the material. Preferably the material is maintained at a temperature of between 120° F. and 180° as by the thermostat 38 mentioned and suitable cooperating controls acting on the supply of heating medium.

The mixer shaft 31 extends through the fluid tight bearing 30 in the end wall of the mixing chamber and is driven by a motor M through gears, chains or the like 45.

Means are provided in the aeration chamber for spreading the material in the presence of air to obtain the maximum aeration in a minimum of time and in a minimum of cubic space.

The means herein illustrated comprises a plurality of discs 50 secured to a pair of shafts 51 journaled in bearings supported by the end plates of the chamber. The peripheries of the discs of one shaft extend substantially into contact with the other shaft between the discs of that shaft, and the shafts rotate in opposite directions to cause the discs to move upward in the center and downward at the outside.

Means are provided for spreading the material in a thin layer about 1/8" thick, more or less, on the discs. The means illustrated comprise horizontal spreader rods 52 between each pair of interfitting discs. The rods substantially contact the shafts at each end. They are supported by vertical rods 53 secured to overhead bars 54 anchored to the casing. Near each end the bars 52 are provided with spacer lugs 55 approximately engaging the discs. Some allowance is made to account for possible out of true condition of the discs. The lugs may rub against the discs in places but the wear will be small as the chocolate acts as a lubricant.

A forced draft of hot air at higher than room temperature, for example at about 180° F., is supplied to the aeration chamber through narrow duct openings 58 at the outside of the casing. The air is preferably blown down toward the bottom of the casing and circulates upward between the discs. The air with moisture and acrid constituents from the chocolate passes out through openings 59 in the center of a cover 60. Preferably the cover is provided with a slidable plate 61 having co-operating openings for closing the openings 59 to any extent desired. If desired, a hood or duct for removing the exhaust air may be provided, although not shown. The hood is provided with hinged doors 62 on each side for access to the chamber.

Means are provided for throwing the material upward for aeration, the same herein comprising a pair of shafts 64 mounted in bearings carried by the end plates of the aeration chamber, and carrying blades 65, located beneath the discs. The shafts rotate in opposite directions to cause the blades to move upward in the center.

Means are provided for removing the material from the discs after aeration. The means herein provided comprises V-shaped flexible-edge scraper blades 66 mounted on backing ribs 67 extending upward from a base bar 68. The ribs are secured to the bar 68 by set screws 69. The bar 68 fits closely against the peripheral edges of the discs to seal the space between the discs and the bottom of the chamber. The bars are provided with V-shaped notches to receive the scraper blades and ribs.

At their upper ends the ribs 67 are curved to ride against the shafts 51. The scraper blades and the bar 68 serve as a substantially fluid tight partition between the central compartment where material is fed to the discs and the discharge compartment. In normal operation material can thus fill the feed compartment up to the spreader rods 52. The spread-out material is exposed to the air for approximately three-quarters of the angular extent of the discs. The air flows upward against the direction of travel of the discs so that the driest, warmest air strikes the material which has been aerated for the longest time. This is indicated by arrows in Fig. 5.

Means are provided for returning the aerated material scraped from the discs to the mixing chamber. As illustrated, this means comprises screw conveyors 72 placed on either side of the aerating and mixing chambers. In the aerating chamber the screw conveyors are exposed in the bottoms of material-receiving pockets (Fig. 5) and alongside the mixing chamber the conveyors are confined in close fitting tubes 73 located in the heating jacket.

At the ends opposite the aerating chamber (Fig. 8) the tubes open into the rear end of the mixing chamber at 74 so as to return the material thereinto.

The two spiral conveyors 72 (Fig. 6) are driven from the mixer shaft 31 by gears or sprockets and chains 77.

At their opposite ends (Fig. 3) the shafts of the spiral conveyors 72 are respectively provided with gears or sprockets and chain 78 and 79 for driving the disc shafts 51 and the shafts 64 of the disc feeder blades respectively. Gears 80 are employed for causing the two disc shafts 51 to rotate together. Similarly, gears 81 are employed for causing the two disc feeding blade shafts 64 to rotate together.

Means are provided for supplying air at regulated temperature to the disc chamber 21. The means herein illustrated (Figs. 2 and 3) comprises a blower 84 driven by a motor M1 and conduits 85 leading from the blower to the duct openings 58 (Fig. 5). The air may be heated by heaters 86 arranged in the conduits. The heaters may be heated by any suitable means, as for example, by steam from supply pipes 87. The temperature may be controlled by regulating the supply of steam through a valve control device 88 in accordance with the temperature of air in the disc chamber as registered by a thermostat device 89.

The temperature of the mixing chamber may be regulated from the thermostat 38 by a device 90 adapted to control the inlet valves of the pipes 44 (Fig. 2). An outlet pipe 91 may be provided at the bottom of the mixing chamber.

Means are provided for removing material from the machine. The means herein provided comprises (Fig. 5) a slidable gate 94 closing an opening 95 at the bottom of the disc feed compartment. The outer end of the gate is provided with a rack 96 cooperating with a gear 97 on a gate operating shaft 98.

In operation, material is supplied through the duct 41 into the mixing chamber 20 and is thoroughly mixed to bring it to a semi-liquid condition. The gate 24 is then opened, allowing the material to flow through the opening 23 into the feeding compartment of the disc chamber 21. The end blade 36 on the mixing shaft 31 assists the flow of material through the opening.

The material in the feeding compartment of the disc chamber will tend to rise to the level of the material in the mixing chamber. The blades 65 on the shafts 64 will assist in throwing the material up on the discs until it rises approximately to the disc shafts 51.

The rotation of the discs causes material to be carried upward into the aeration zone, the rods 52 wiping the material into thin layers about 1/8" thick on each side of the discs. The discs are relatively large, in one size machine being approximately 42 inches in diameter. All of the discs together, therefore, hold a very large amount of material. Assuming that a machine of one selected size holds 3000 pounds of chocolate, 10% of it may be on the discs spread out on an area of approximately 62,400 sq. in. or 433 sq. ft. This is approximately 14½ sq. ft. of aerating area for each 100 lbs. of material.

So far as applicant can learn it has never before in the prior art been customary to process chocolate in a manner to employ a definite large ratio of aeration surface to mass of material being treated. According to the present invention a predetermined and very large aeration surface per unit mass of material being processed, is provided. The most advantageous ratio appears to be approximately 10 sq. ft. and above per 100 lbs. of material but an area somewhat less than 10 sq. ft. down to about 5 sq. ft. per 100 lbs. constitutes a decided improvement over the prior art, which was limited to small aeration areas per unit of mass. Actually, in most conching processes which have been practiced commercially the aeration area was limited to the small amount existing for a short time which was merely incidental to the conching or grinding action; and in the few instances in the published art where aeration has been purposefully suggested the ratio of area to mass is so small as to fail entirely to accomplish the results attained by the present invention.

The speed of the discs is much slower than the speed of the mixer shaft to provide ample time for aeration. For example the discs may rotate at two revolutions per minute. The speed may be varied within a practicable range and may depend upon variations in the temperature of the air supplied, the thickness of the layer on the disc and other factors.

Referring to Fig. 4, the material during normal operation with the discs fully coated, stands at a level L slightly above the blade hubs on the mixing shaft 31. The blades therefore have a distinct beating or flapping action where they enter and leave the surface of the material. Since air is present above the surface of the material there will be considerable aeration in the mixing chamber. This is in addition to the aeration on the discs.

After the material has travelled around on the discs 50 it is removed by the scraper blades 66; whereupon it falls into the pockets upon the screw conveyors 72 and is returned by the conveyors to the rear end of the mixing chamber. The material thus follows a fixed cycle of movement to assure full aeration of every particle. That is, each particle gets substantially the same treatment as every other particle because there is a directed circulation and not a random uncertain circulation which appears to characterize previous processes.

In certain instances, as in large plants, it may be preferred to place several aerating and mixing devices in series and feed from one aerating device to another mixing device and so on. In this way the process may be made continuous as distinguished from a batch treatment.

It is to be noted that the material is substantially in the zone of moving parts in every portion of the machine, that is, there are no pipes or dead spaces where material may escape the cycle of movement. The machine itself when emptied clears out practically all material.

It is also to be noted that all of the material at all times is within a zone of accurate controlled heating, either by air in the aeration chamber or by the heating medium in the jacketed mixing chamber.

The material circulates and re-circulates very rapidly in the machine until its treatment is completed. It has been found that the full taste of the chocolate is developed and other desired treatments are completed by my machines in an unusually short time as compared with previous machines known in the art. Also less cocoa butter is required than with previously known machines and processes.

No attempt will be made to explain in detail the reactions which occur when material is treated according to the present process and by the apparatus hereby provided. There may be emulsification, drying, oxidation, caramelization, stabilization, improvement in consistency, improvement in flavor through elimination of undesirable ingredients, and other effects. There may also be some breaking up of particles or groupings of particles. Whatever may be the effects, the final product is highly satisfactory and is produced in far less time than formerly was believed possible.

The various controls provided make the machine extremely flexible in use. For example, the heat in the mixing chamber and the aerating chamber may be separately controlled and set at any point desired; and the mixing chamber may be partially or wholly shut off from the aerating chamber to vary the degree of mixing relative to aeration to any extent desired. It is, therefore, possible to achieve the desired taste development at approximately the same time the desired consistency is attained and without the use of unnecessary amounts of cocoa butter. The machines provided by the prior application and also by the present application furnish more than ample aerating surface so that the taste development may be completed even ahead of the attainment of the desired consistency. This is just the reverse of prior processes. There is less danger in over-aerating than in over-mixing; but with the present machine the aeration may be stopped at any point desired and the mixing continued independently.

While one embodiment of the invention has been specifically disclosed, it is to be understood that the invention may have various embodiments within the limits of the prior art and the scope of the subjoined claims.

What is claimed is:

1. Apparatus for treating chocolate to improve its taste, texture and stability, comprising in combination, a beater for vigorously beating a mass of the material and moving it in a directed flow to an aerating zone, extensive aerating means in said aerating zone on which said material is spread, means for passing a stream of conditioned air between said aerating means over the spread-out material, and means for returning material from said aerating means to a beating zone, the amount of material on said aerating means being approximately 10% of the material in the machine and the area of material on the aerating means being approximately 10 sq. ft. or more for each 100 lbs. of material in the machine.

2. A machine for treating chocolate or similar material, comprising in combination, a mixing chamber, mixing blades in said mixing chamber, an aerating chamber adjacent said mixing chamber, and means adjacent one end of the mixing chamber for throwing material up for aeration.

3. A machine for treating chocolate or similar material, comprising in combination, a mixing chamber, mixing means in said mixing chamber extending through the surface of material therein, an adjacent aerating chamber, and aerating means therein extending downward therein below the normal surface level of material in the mixing chamber, whereby material will tend to reach said aerating means by hydrostatic flow.

4. A machine for treating chocolate or similar material, comprising in combination, a mixer, an aerating device including a plurality of parallel rotary discs, and means for spreading material in a layer on said discs, said means including a rod disposed between the discs, and means for supporting the rod from outside the peripheries of said discs.

5. A machine as set forth in claim 4 which further includes in combination, lugs on said rod to space it from the discs.

6. A machine for treating chocolate or similar material, comprising in combination, mixing means, aerating means including parallel rotary discs, means for spreading layers of material on said discs, and means for scraping aerated material from the discs, said scraping means comprising flexible blades secured to a rib-like backing member.

7. A machine for treating chocolate or similar material, comprising in combination, a mixing chamber, mixing means therein, an adjacent aerating chamber, aerating means therein, a partition between said chambers having an opening therein at the bottom, closure means for said opening, whereby material may be confined in the mixing chamber or admitted to the aerating chamber, a pair of rotary bladed devices in said aerating chamber for forcing the material upward to said aerating means, and a discharge outlet below said devices.

8. A machine for treating chocolate or similar material, comprising in combination, a jacketed mixing chamber, a mixing shaft with two series of oppositely inclined blades thereon, the blades being partly submerged in the material so as to enter and leave the surface which is exposed to air, an aerating chamber, a pair of shafts carrying a plurality of discs in said aerating chamber, means to supply heated air near the bottom of said discs and remove it at the top, rotary blades for throwing material up to said discs, rods between the discs for spreading material in a thin layer thereon, blades for scraping material from the discs, and screw conveyors on each side of the chambers and within the jacketed enclosure for returning material from the scrapers to the rear end of the mixing chamber.

9. A machine for treating chocolate or similar material, comprising in combination, a mixing chamber, mixing means therein, an adjacent aerating chamber, aerating means therein, a partition between said chambers having an opening therein at the bottom, closure means for said opening, whereby material may be confined in the mixing chamber or admitted to the aerating chamber, a pair of rotary bladed devices in said aerating chamber for forcing the material upward to said aerating means, and a discharge outlet below said devices, said aerating means comprising two sets of alternating discs on parallel shafts which are also parallel in direction with the shafts of the mixing means and the rotary bladed devices.

10. A machine for treating chocolate or similar material, comprising in combination, a mixing chamber, an aerating chamber at one end of the mixing chamber and having its bottom near the level of the bottom of the mixing chamber, a rotary bladed mixer in the mixing chamber adapted to sweep the walls thereof and to move the material toward the aerating chamber, the mixer being only partially immersed in the material, a partition between said chambers having a gate controlled opening in the bottom, rotary aerating discs in said aerating chamber having their upper portions at sufficient elevation to raise material carried on the discs considerably above the level of the material in the mixing chamber, rotary bladed devices in the lower part of the aerating chamber for urging material upward to said discs, means for spreading material on said discs as they move upward, means for scraping material from the discs as they move downward, spiral conveyor means opening at one end to said aerating chamber and including closed tubes opening into the distant end of the mixing chamber for moving material scraped from the discs back into said mixing chamber, and a closure controlling a discharge outlet in the bottom of the aerating chamber.

11. In an apparatus for processing chocolate, in combination a container for holding a quantity of chocolate; means for agitating said chocolate in the container; and means associated with said container for aerating said chocolate while being processed, said last named means being adapted to expose said chocolate continuously to air on a surface of at least 2 square meters for each 100 kilograms of chocolate in said container.

RUTHERFORD TRUST COMPANY,
*Administrator, with the Will Annexed, of the Estate of Paul Hollstein, Deceased.*
By WILLIAM F. HARVEY,
*Vice-President and Trust Officer.*